(12) United States Patent
Castinado et al.

(10) Patent No.: US 11,295,329 B2
(45) Date of Patent: Apr. 5, 2022

(54) GEOGRAPHIC MAPPING SYSTEM FOR RESOURCE POSITIONING OPTIMIZATION WITHIN AN ENVIRONMENT

(71) Applicant: BANK OF AMERICA CORPORATION, Charlotte, NC (US)

(72) Inventors: Joseph Benjamin Castinado, North Glenn, CO (US); Lee Barry Frantz, Souderton, PA (US); Lee Ann Proud, Ponte Vedra, FL (US); Ann Ta, Scottsdale, AZ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/905,459

(22) Filed: Jun. 18, 2020

(65) Prior Publication Data
US 2021/0398152 A1 Dec. 23, 2021

(51) Int. Cl.
| | |
|---|---|
| G06Q 30/02 | (2012.01) |
| G06Q 50/16 | (2012.01) |
| G06Q 50/28 | (2012.01) |
| G01V 99/00 | (2009.01) |
| G06Q 10/04 | (2012.01) |
| G06F 16/2457 | (2019.01) |
| H04W 4/021 | (2018.01) |
| G06Q 10/06 | (2012.01) |

(52) U.S. Cl.
CPC ....... *G06Q 30/0205* (2013.01); *G01V 99/005* (2013.01); *G06F 16/24578* (2019.01); *G06Q 10/04* (2013.01); *G06Q 10/06375* (2013.01); *G06Q 50/165* (2013.01); *G06Q 50/28* (2013.01); *H04W 4/021* (2013.01)

(58) Field of Classification Search
CPC combination set(s) only.
See application file for complete search history.

(56) References Cited

U.S. PATENT DOCUMENTS 9,760,840 B1* 9/2017 Tyagi ............... G06Q 10/06313
2016/0034712 A1* 2/2016 Patton ..................... G06F 16/29
726/28

(Continued)

*Primary Examiner* — Arif Ullah
(74) *Attorney, Agent, or Firm* — Moore & Van Allen PLLC; R. W. McCord Rayburn

(57) ABSTRACT

A system for geographic resource mapping is provided. The system comprises: a memory device with computer-readable program code stored thereon; a communication device connected to a network; a processing device, wherein the processing device is configured to execute the computer-readable program code to: receive a geographic location for a proposed resource site from a user; extract historical interaction information associated with the geographic location and the user from an interaction database; generate a resource map for the geographic location based on the historical interaction information and the proposed resource site; calculate a landscape score for the proposed resource site at the geographic location, wherein the landscape score compares the proposed resource site with other resource sites associated with the geographic location based on the generated resource map; and based on the landscape score falling below a predetermined threshold, reject the proposed resource site at the geographic location.

14 Claims, 5 Drawing Sheets

(56) References Cited

U.S. PATENT DOCUMENTS

| | | | |
|---|---|---|---|
| 2016/0189184 A1* | 6/2016 | Lee | G06Q 30/0201 |
| | | | 705/7.31 |
| 2016/0203522 A1* | 7/2016 | Shiffert | H04L 67/104 |
| | | | 705/14.58 |
| 2020/0111037 A1* | 4/2020 | Mondal | G06Q 20/4016 |

* cited by examiner

GEOGRAPHIC MAPPING SYSTEM FOR RESOURCE POSITIONING OPTIMIZATION WITHIN AN ENVIRONMENT

BACKGROUND

Typically, users establishing a new resource site have limited data for driving decisioning for a selection of a geographic location. Available data may be limited in scope without providing a holistic view of a defined geographic region of interest. As such, there exists a need for an improved location mapping and recommendation system for enabling informed placement of resource sites based on real-time data.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system for geographic resource mapping is provided. The system comprising: a memory device with computer-readable program code stored thereon; a communication device connected to a network; a processing device, wherein the processing device is configured to execute the computer-readable program code to: receive a geographic location for a proposed resource site from a user; extract historical interaction information associated with the geographic location and the user from an interaction database; generate a resource map for the geographic location based on the historical interaction information and the proposed resource site; calculate a landscape score for the proposed resource site at the geographic location, wherein the landscape score compares the proposed resource site with other resource sites associated with the geographic location based on the generated resource map; and based on the landscape score falling below a predetermined threshold, reject the proposed resource site at the geographic location.

In one specific embodiment, the processing device is further configured to provide an alternative geographic location for the proposed resource site based on the landscape score falling below a predetermined threshold. In another embodiment, the landscape score is a first landscape score, and wherein providing the second location further comprises calculating a second landscape score for the alternative geographic location, wherein the second landscape score is higher than the predetermined threshold or the first landscape score.

In yet another embodiment, generating the resource map further comprises displaying the resource map as a heat map for the proposed resource site and the other resource sites for the geographic location in an interactive user interface presented in an application on a user device.

In yet another embodiment, the processing device is further configured to generate a geofenced area around the geographic location, wherein the resource map is defined by the geofenced area. In yet another embodiment, the processing device is further configured to recalculate the geofenced area based on real time updates to the historical interaction information.

In yet another embodiment, the historical interaction information stored in the interaction database comprises interaction locations, interaction amounts, resource types, resource amounts, and interaction device information.

A computer-implemented method for geographic resource mapping is also provided. The computer-implemented method comprising: receiving a geographic location for a proposed resource site from a user; extracting historical interaction information associated with the geographic location and the user from an interaction database; generating a resource map for the geographic location based on the historical interaction information and the proposed resource site; calculating a landscape score for the proposed resource site at the geographic location, wherein the landscape score compares the proposed resource site with other resource sites associated with the geographic location based on the generated resource map; and based on the landscape score falling below a predetermined threshold, rejecting the proposed resource site at the geographic location.

In one specific embodiment, the computer-implemented method further comprises providing an alternative geographic location for the proposed resource site based on the landscape score falling below a predetermined threshold. In another embodiment, the landscape score is a first landscape score, and wherein providing the second location further comprises calculating a second landscape score for the alternative geographic location, wherein the second landscape score is higher than the predetermined threshold or the first landscape score.

In yet another embodiment, generating the resource map further comprises displaying the resource map as a heat map for the proposed resource site and the other resource sites for the geographic location in an interactive user interface presented in an application on a user device.

In yet another embodiment, generating the resource map further comprises generating a geofenced area around the geographic location, wherein the resource map is defined by the geofenced area. In yet another embodiment, the computer-implemented method further comprises recalculating the geofenced area based on real time updates to the historical interaction information.

In yet another embodiment, the historical interaction information stored in the interaction database comprises interaction locations, interaction amounts, resource types, resource amounts, and interaction device information.

A computer program product for geographic resource mapping is also provided. The computer program product comprises a non-transitory computer-readable medium comprising computer-readable instructions, the computer-readable instructions, when executed by a processing device, cause the processing device to: receive a geographic location for a proposed resource site from a user; extract historical interaction information associated with the geographic location and the user from an interaction database; generate a resource map for the geographic location based on the historical interaction information and the proposed resource site; calculate a landscape score for the proposed resource site at the geographic location, wherein the landscape score compares the proposed resource site with other resource sites associated with the geographic location based on the generated resource map; and based on the landscape score falling below a predetermined threshold, reject the proposed resource site at the geographic location.

In one specific embodiment, the computer-readable instructions, when executed by the processing device, further cause the processing device to provide an alternative geographic location for the proposed resource site based on the landscape score falling below a predetermined threshold. In another embodiment, the landscape score is a first landscape score, and wherein providing the second location further comprises calculating a second landscape score for the alternative geographic location, wherein the second landscape score is higher than the predetermined threshold or the first landscape score.

In yet another embodiment, the computer-readable instructions, when executed by the processing device, further cause the processing device to display the resource map as a heat map for the proposed resource site and the other resource sites for the geographic location in an interactive user interface presented in an application on a user device.

In yet another embodiment, generating the resource map further comprises generating a geofenced area around the geographic location, wherein the resource map is defined by the geofenced area. In yet another embodiment, the computer-readable instructions, when executed by the processing device, cause the processing device to recalculate the geofenced area based on real time updates to the historical interaction information.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
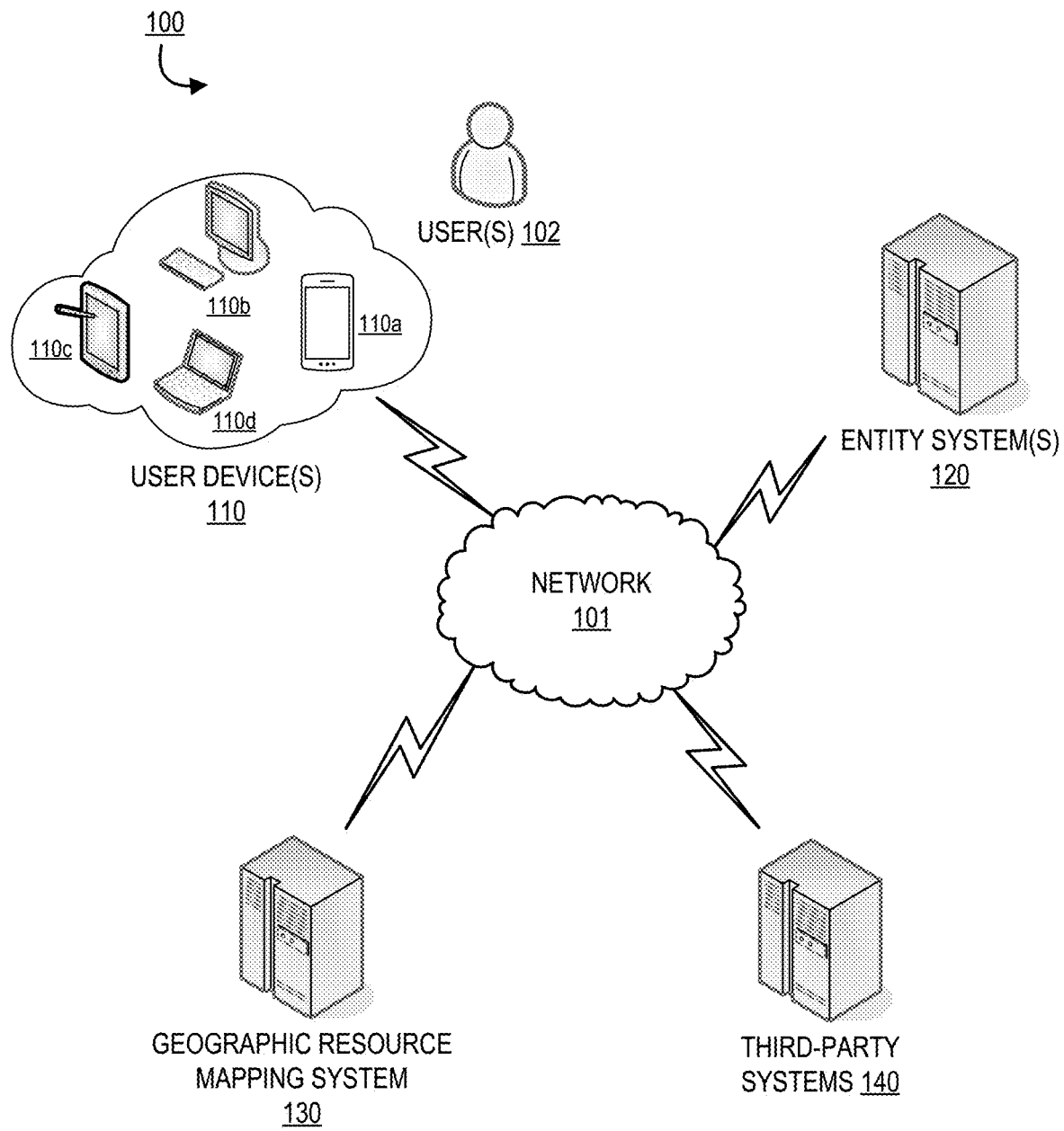
Figure 2:
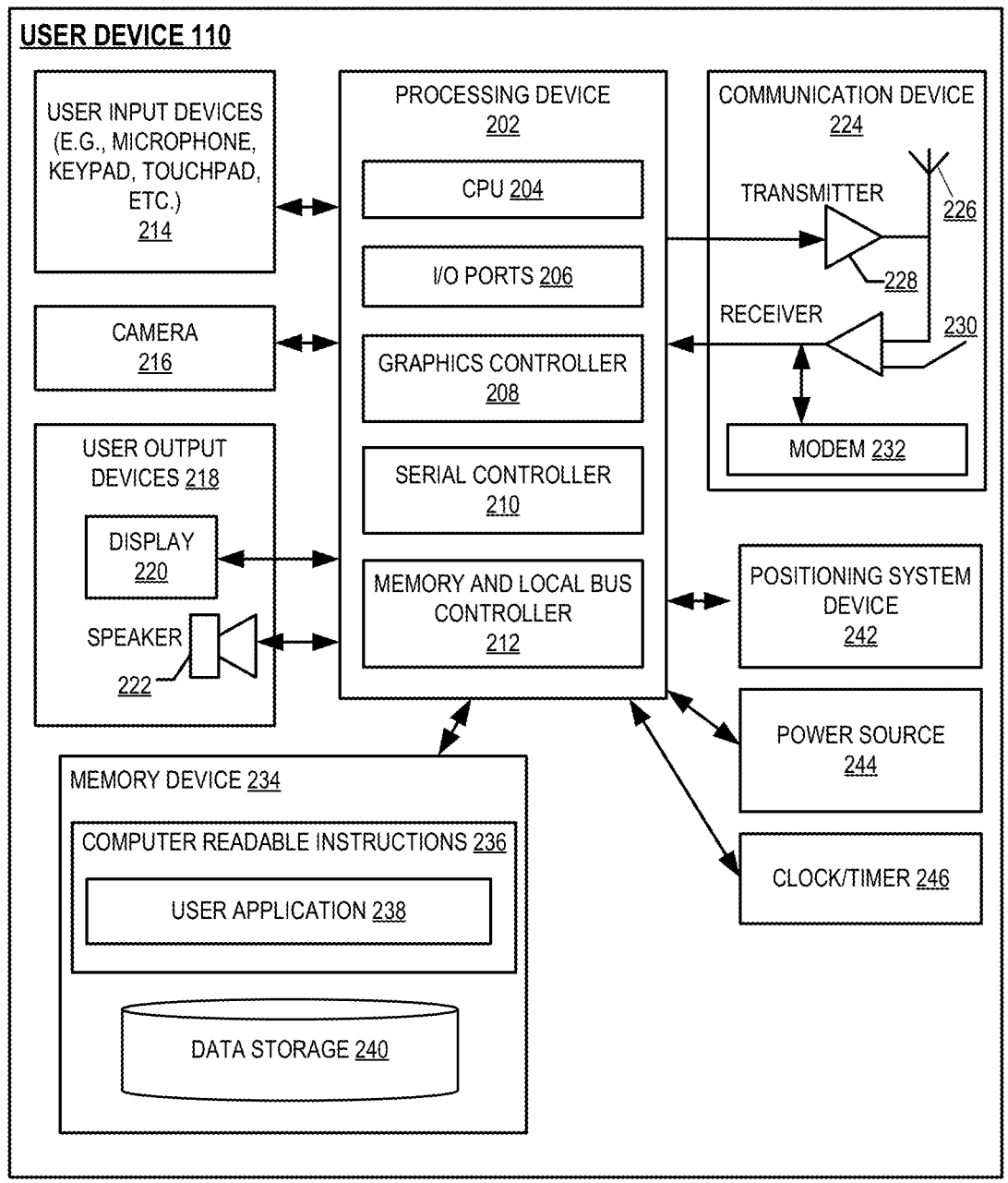
Figure 3:
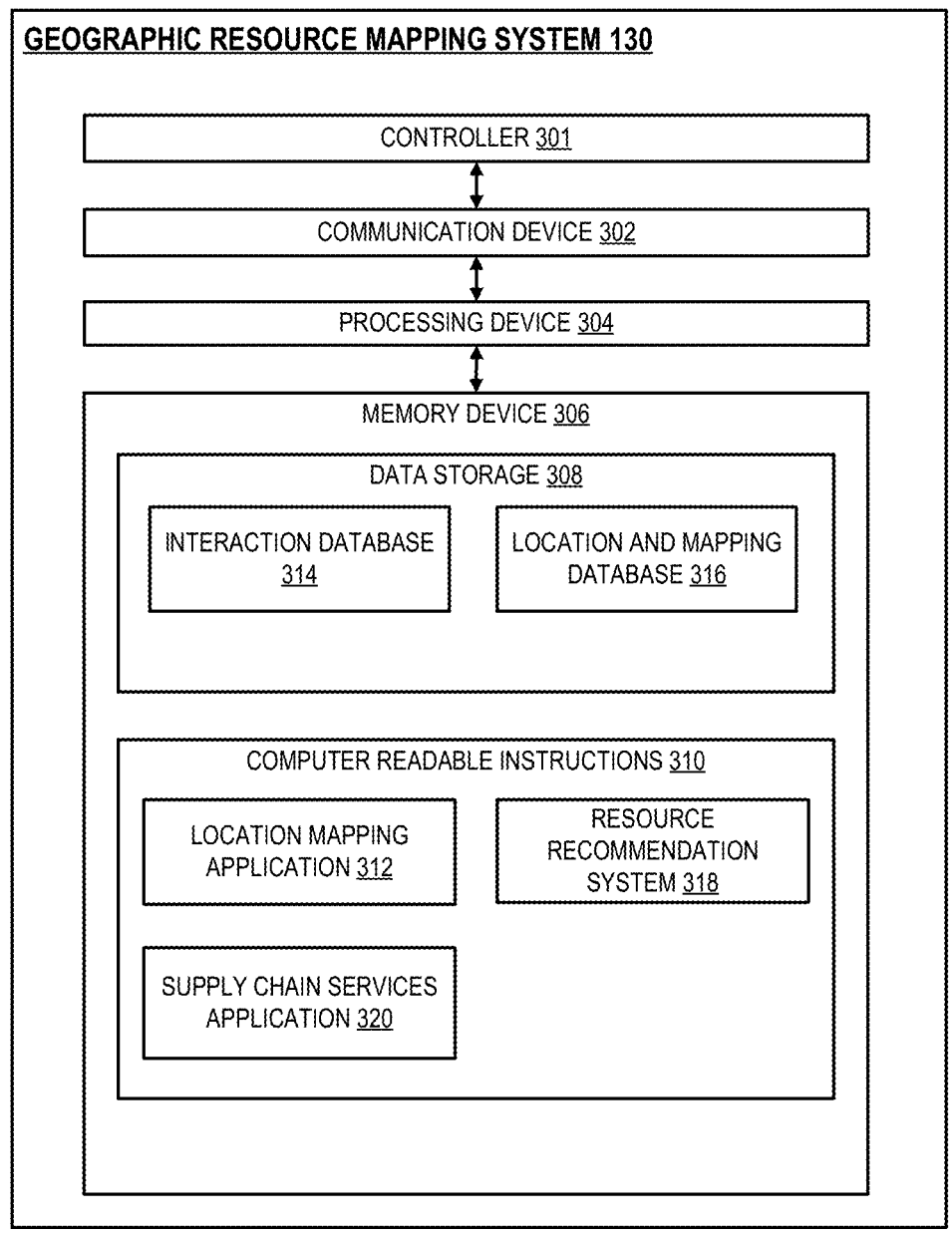
Figure 4:
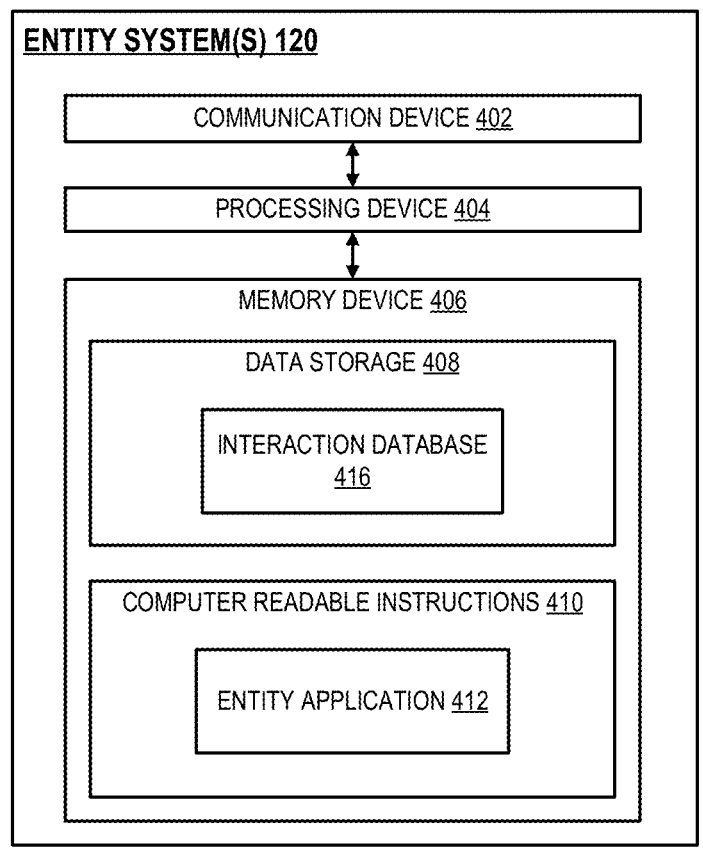
Figure 5:
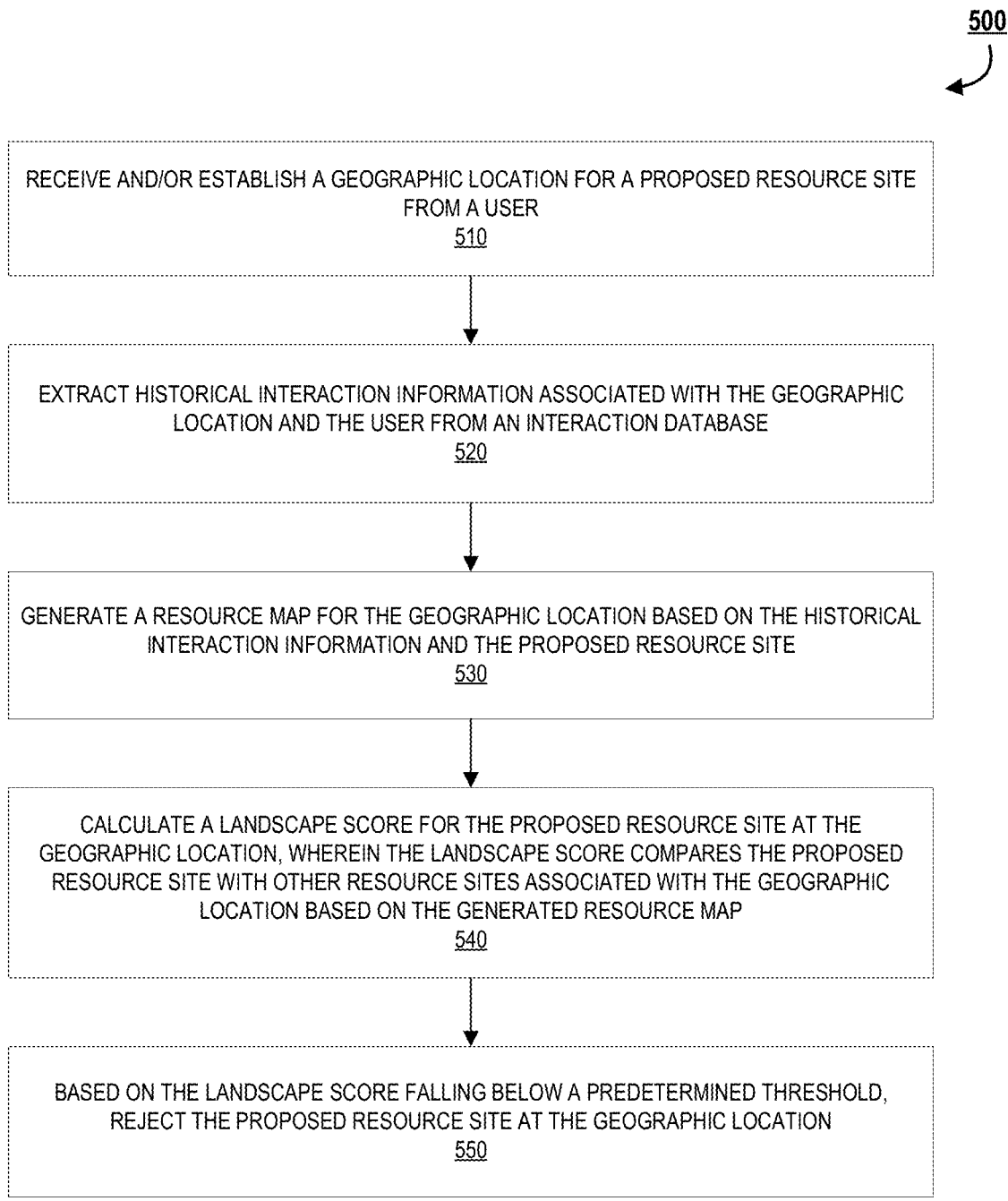

Having thus described embodiments of the invention in general terms, reference will now be made to the accompanying drawings, wherein:

FIG. 1 provides a geographic resource mapping system environment, in accordance with one embodiment of the invention;

FIG. 2 provides a block diagram of a user device, in accordance with one embodiment of the invention;

FIG. 3 provides a block diagram of a geographic resource mapping system, in accordance with one embodiment of the invention;

FIG. 4 provides a block diagram of an entity system, in accordance with one embodiment of the invention; and FIG. 5 provides a high level process flow for geographic resource mapping and positioning optimization, in accordance with one embodiment of the invention.

DETAILED DESCRIPTION OF EMBODIMENTS OF THE INVENTION

The system of the invention is configured to receive and analyze a proposed geographic location (e.g., a specific location, a neighborhood, area code, region, or the like) from a user for a new or proposed resource site. The system is configured to communicate with an interaction database that may be maintained by an entity and extract historical interaction information associated with the geographic location and the user. This historical interaction information may comprise, for example, previous and/or other current resource sites associated with the geographic location as well as interaction data such as historical interaction location data, interaction amounts, resource types, resource amounts, and device data associated with interaction. Using this extracted data, the system is configured to generate a resource map for the geographic location to model the resource and/or resource site distribution for the geographic location. Furthermore, the system leverages the resource map to aid in calculating a landscape score for the proposed resource site, wherein the proposed site may be compared to other sites associated with the geographic location. The system is configured to use the mapping and scoring to approve or reject the proposed resource site. In some embodiments, the system is configured to further provide one or more alternative locations for the proposed resource site based on the analyzed data. In a specific embodiment, the system is configured to generate a resource heat map for the geographic location, wherein the heat map may be displayed and presented to a user via an application on a user device.

Embodiments of the invention are directed to improvements to resource and location mapping technology and, in particular, as applied to analyzing proposed resource site placement within a geographic area. Embodiments of the present invention use location and interaction data in non-conventional, unexpected ways by calculating landscape scores for a geographic location and identifying alternative locations. In some embodiments, the invention provides real-time recalculation of the landscape scoring in response to changes in the extracted interaction and location data.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, a "resource" refers to goods, products, services, funds, or the like offered by a user to another user or exchanged by users in an interaction. In some embodiments, a resource may comprise a "computing resource" which may refer to elements of one or more computing devices, networks, or the like available to be used in the execution of tasks or processes. A computing resource may be used to refer to available processing, memory, and/or network bandwidth, data usage or data transfer bandwidth or limits, and/or power of an individual computing device as well a plurality of computing devices that may operate as a collective for the execution of one or more tasks (e.g., one or more computing devices operating in unison). In some embodiments, user resources such as computing resources may include an amount of use-time during which the resources are being utilized by the system and/or other systems and devices described herein.

As used herein, the term "user" may refer to any entity or individual associated with the geographic resource mapping system. In some embodiments, a user may be a computing device user, a phone user, a mobile device application user, a customer of an entity or business (i.e., an interaction provider or resources supplier), a system operator, and/or employee of an entity (e.g., a financial institution). In one embodiment, the user is an individual or customer (e.g., account holder) interacting with one or more devices within the system. In a specific embodiment, the user is prospective user deciding upon a location to establish a resource site (e.g., a business). In another embodiment, the user is a business, vendor, or the like. In another embodiment, a user may be a system administrator, technician, software or application developer, computer engineer, support associate, or the like associated with the geographic resource mapping. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, point-of-sale devices, wearable devices, cameras, video recorders, audio/video player, ATMs, global positioning system (GPS) devices, entertainment devices, or any combination of the aforementioned. The device may be used by the user to access the system directly or through one or more applications, an online portal, internet browser, virtual private network, or other connection channel. The user device comprises a display for providing a user interface to the user for interacting with an application displayed on the device and presented to the user. In some embodiments, a user device may comprise a clock/timer or counter, camera, location sensor or other geolocation device (e.g., GPS), or the like.

As used herein, the term "entity" may be used to include any organization or collection of users that may interact with the geographic resource mapping system. An entity may refer to a business, company, or other organization that either maintains or operates the system or requests use and accesses the system. In one embodiment, the entity may be a business or financial entity. The terms "financial institution" and "financial entity" may be used to include any organization that processes financial interactions or transactions including, but not limited to, banks, resource management firms, insurance companies and the like. In specific embodiments of the invention, use of the term "bank" is limited to a financial entity in which account-bearing customers conduct financial transactions, such as account deposits, withdrawals, transfers, temporary resource allowance, and the like. In other embodiments, an entity may be a business, organization, a government organization or the like that is not a financial institution. In some embodiment, an entity may be a business, vendor, or the like that provides a resource (e.g., goods, services, or other resources) to another user or entity via an interaction at an interaction location (e.g., within an application, a web site, brick-and-mortar location).

As used herein, "authentication information" may refer to any information that can be used to authenticate an identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. In some embodiments, authentication information may refer to any information provided by a user, entity, or the like to verify an identify and/or status of the user, entity, data associated with a user or entity, or the like.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, data archive, or data structure, wherein the system reaches out to the database and watches, observes, or checks the database for changes, updates, and the like. In other embodiments, a system may passively monitor a database or data stream, wherein the database or data stream provides information to the system and the system then watches, observes, or checks the provided information. In some embodiments, "monitoring" may further comprise analyzing or performing a process on something such as a data source or data stream either passively or in response to an action or change in the data source or data stream. In a specific embodiment, monitoring may comprise identifying real-time changes in historical interaction information and location data. Monitoring of user data streams is performed by the system with approval or authorization by the monitored user device and user.

As used herein, an "interaction" may refer to any action or communication between one or more users, one or more entities or institutions, and/or one or more devices or systems within the system environment described herein. For example, an interaction may refer to a user interaction with a system or device, wherein the user interacts with the system or device in a particular way. In one embodiment, interactions may be received or extracted through interaction with a data stream (e.g., in real-time). In some embodiments, an interaction may refer to an exchange of resources between users, entities, or the like. In some embodiments, an interaction comprises a data transfer between devices or locations within the environment of the system described herein. For example, an interaction may require a transfer or migration of data between data storage locations.

In some embodiments, an interaction may further include user interactions with a user interface of a user application (e.g., clicking, swiping, text or data entry, etc.), authentication actions (e.g., signing-in, username and password entry, PIN entry, etc.), account actions or events (e.g., account access, fund transfers, document or record views and/or transfers, etc.) and the like. In another example, an interaction may refer to a user communication via one or more channels (i.e., phone, email, text, instant messaging, brick-and-mortar interaction, and the like) with an entity and/or entity system to complete an operation or perform an action.

FIG. 1 provides a geographic resource mapping system environment 100, in accordance with one embodiment of the invention. As illustrated in FIG. 1, geographic resource mapping system 130 is operatively coupled, via a network 101, to the user device(s) 110 (e.g., a plurality of user devices 110a-110d), the entity system(s) 120, and third party systems 140. In this way, the geographic resource mapping system 130 can send information to and receive information from the user device 110, the entity system 120, and the third party systems 140. In the illustrated embodiment, the plurality of user devices 110*a*-110*d* provide a plurality of communication channels through which the entity system 120 and/or the geographic resource mapping system 130 may communicate with the user 102 over the network 101.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual interacting with one or more user devices either actively or passively, wherein the user devices are configured to interact and transmit commands to the geographic resource mapping system 130. In one embodiment, the data stream may be generated or modified, for example, by one or more entity systems 120 while the data stream between the user device 110 and the entity system 120 is monitored by the geographic resource mapping system 130 over the network 101. In an alternative embodiment, the user 102 is an individual interacting with the geographic resource mapping system 130 over the network 101 and monitoring a transfer of data between the user devices 110 and the entity systems 120 using the geographic resource mapping system 130 (e.g., an employee of the entity operating and/or monitoring the systems 120, 130).

FIG. 2 provides a block diagram of a user device 110, in accordance with one embodiment of the invention. The user device 110 may generally include a processing device or processor 202 communicably coupled to devices such as, a memory device 234, user output devices 218 (e.g., a user display device 220, or a speaker 222), user input devices 214 (e.g., a microphone, keypad, touchpad, touch screen, and the like), a communication device or network interface device 224, a power source 244, a clock or other timer 246, a visual capture device such as a camera 216, a positioning system device 242, such as a geo-positioning system device (e.g., GPS device), and the like. In one embodiment, the camera 216 may include a scanner or any other image capturing device. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120 via a user interface. In some embodiments, the user application 238 is an application for interacting with other systems and devices over a network. In one embodiment, the user application 238 is configured to present a user interface to the user 102 on the display 220 of the user device 110, wherein the user 102 may interact with the user interface and the systems described herein.

The processing device 202 may be configured to use the communication device 224 to communicate with one or more other devices on a network 101 such as, but not limited to the entity system 120 and the geographic resource mapping system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 101. In this regard, the user device 110 may be configured to operate with one or more air interface standards, communication protocols, modulation types, and access types. By way of illustration, the user device 110 may be configured to operate in accordance with any of a number of first, second, third, fourth, and/or fifth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, the one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

FIG. 3 provides a block diagram of a geographic resource mapping system 130, in accordance with one embodiment of the invention. The geographic resource mapping system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, third party systems 140, and/or the geographic resource mapping system 130, in order to interface and manage data flow between devices and systems while executing commands to control the systems. In some embodiments, the controller may be integrated into one or more of the systems described herein. In other embodiments, the controller may be a separate system or device. In some embodiments, the controller may perform one or more of the processes, actions, or commands described herein.

As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the geographic resource mapping system 130 comprises computer-readable instructions 310 stored in the memory device 306, which in one embodiment includes the computer-readable instructions 310 of a location mapping application 312, a resource recommendation application 318, and a supply chain services application 320.

The location mapping application 312 is configured to track and analyze location data associated with one or more interactions, resources, resource sites, users or customers, and the like. In some embodiments the location mapping application 312 is configured to generate a resource map based on the location and interaction data collected and monitored by the system. The resource recommendation application 318 is configured to analyze the collected location and interaction data and determine one or more alternative geographic locations for a proposed resource site. In some embodiments the resource recommendation application 318 is further configured to calculate a landscape score for a location and/or resource site based on the interaction data and the location data. The supply chain services application 320 is configured to provide an interactive platform for user communication with other similar or related users within a define geographic location. For example, the platform may connect users with similar or related resource sites for enabling resource exchanges and other interactions between the users. In one embodiment the supply chain services application 320 is in communication with a user application of a user device 110 or, alternatively, installed on a user device 110.

In some embodiments, the memory device 306 includes data storage 308 for storing data related to the system environment, but not limited to data created and/or used by the location mapping application 312, resource recommendation application 318, and supply chain services application 320. Data stored in the data storage 308 may comprise an interaction database 314 and a location and mapping database 316.

The interaction database 314 is used to store information regarding past or historical interactions (e.g., interactions, resource transfers or exchanges, user communications, etc.) associated with one or more users and/or resource cites and various geographic locations. The interaction database 314 may further include information or data related to the interactions such as user data, user selections, and the like. In some embodiments, the user interaction database includes interaction amounts, resource types, resource amounts, and the like associated with recorded interactions. In some embodiments, the interaction database 314 may be configured to store data from an incoming data stream in real-time. The system may be configured to access and update stored information and data stored in the interaction database 314 as additional information is collected.

The location and mapping database 316 is configured to store location data associated with one or more users, user devices, interactions, resource sites, and the like. In some embodiments, the location and mapping database 316 is further configured to store one or more resource maps generated by the system, wherein the resource maps may be later accessed by a user. In some embodiments, the location and mapping database 316 is further configured to store alternative or simulated resource maps based on simulated data.

In one embodiment of the invention, the geographic resource mapping system 130 may associate with applications having computer-executable program code that instruct the processing device 304 to perform certain functions described herein. In one embodiment, the computer-executable program code of an application associated with the user device 110, third party systems 140, and/or the entity systems 120 may also instruct the processing device 304 to perform certain logic, data processing, and data storing functions of the application.

Embodiments of the geographic resource mapping system 130 may include multiple systems, servers, computers or the like maintained by one or many entities. In some embodiments, the geographic resource mapping system 130 may be part of the entity systems 120. In other embodiments, the entity systems 120 are distinct from the geographic resource mapping system 130. The geographic resource mapping system 130 may communicate with the entity systems 120 via a secure connection generated for secure encrypted communications between the two systems either over the network 101 or alternative to the network 101.

As illustrated in detail in FIG. 4, the environment 100 further includes one or more entity systems 120 which are connected to the user device 110, the geographic resource mapping system 130, and the third party systems 140. The entity systems 120 may be associated with one or more entities, institutions, or the like. The entity systems 120 generally comprise a communication device 402, a processing device 404, and a memory device 406 further comprising data storage 408. The entity systems 120 comprise computer-readable instructions 410 stored in the memory device 406, which in one embodiment includes the computer-readable instructions of an entity application 412. The entity systems 120 may communicate with the user device 110, third party systems 140, and the geographic resource mapping system 130 to provide access to information and accounts stored and maintained on the entity systems 120. In some embodiments, the entity system 120 may communicate with the geographic resource mapping system 130 during an interaction with a user 102 in real-time, wherein user interactions may be monitored and processed by the geographic resource mapping system 130. In some embodiments, data storage 408 comprises an interaction database 416 to either supplement or replace interaction and location storage of the geographic resource mapping system 130 as previously discussed.

The systems of the environment 100 are configured to receive and analyze a proposed geographic location (e.g., a specific location, a neighborhood, area code, region, or the like) from a user for a new or proposed resource site. The system is configured to communicate with an interaction database that may be maintained by an entity and extract historical interaction information associated with the geographic location and the user. This historical interaction information may comprise, for example, previous and/or other current resource sites associated with the geographic location as well as interaction data such as historical interaction location data, interaction amounts, resource types, resource amounts, and device data associated with interaction. Using this extracted data, the system is configured to generate a resource map for the geographic location to model the resource and/or resource site distribution for the geographic location. Furthermore, the system leverages the resource map to aid in calculating a landscape score for the proposed resource site, wherein the proposed site may be compared to other sites associated with the geographic location. The system is configured to use the mapping and scoring to approve or reject the proposed resource site. In some embodiments, the system is configured to further provide one or more alternative locations for the proposed resource site based on the analyzed data. In a specific embodiment, the system is configured to generate a resource heat map for the geographic location, wherein the heat map may be displayed and presented to a user via an application on a user device.

FIG. 5 provides a high level process flow for geographic resource mapping and positioning optimization, in accordance with one embodiment of the invention. In some embodiments, the process flow of FIG. 5 is executed or performed by the system environments of the previous figures. As illustrated at block 510 of FIG. 5, the system is configured to first receive a geographic location for a proposed resource site from a user. As used herein, a resource site may refer to any building (e.g., a storefront, restaurant, warehouse, distribution center, manufacturing facility, etc.), vehicle, cart, stall or stand, or similar mobile or stationary structure, or the like used to handle and/or process one or more resources (e.g., products, goods, and/or services). In some embodiments, a user is an owner, employee, investor, or similarly associated with a resource site. In some embodiments, the user may be requesting or proposing establishment of a new resource site or relocation of an existing resource site at a specified geographic location. In some embodiments, the user is requesting resource assistance with the proposed resource site from an entity associated with the system. In another embodiment, the user is utilizing the system as a tool for optimized positioning of the proposed resource site within a geographic location.

In some embodiments, a geographic location may be a particular location, address, or the like such as a particular brick-and-mortar structure or building (e.g., a storefront). In some embodiments a geographic location may further comprise a larger, defined area such as a collection of buildings or properties, a neighborhood or community, one or more city blocks, a region, an area code, a county, a town, a city, a state, a country or the like. In one embodiment, a geographic location may comprise one or more GPS-determined coordinates defining the location or area. In some embodiments, the geographic location may be a geofenced area, wherein the defined area is variable and may be updated by the system over time with identified changes in monitored database collections.

In some embodiments, the system is configured to receive a geographic location from a user along with a request for a proposed resource site. In one embodiment, the user may transmit information associated with the proposed resource site (e.g., resource site type, interaction types, resource types, etc.) to the system along with at least one proposed geographic location. In other embodiments, the system may be configured to automatically identify one or more geographic locations for the user in response to receiving the initial request for the proposed resource site, wherein potential geographic locations are identified according to the location landscape scoring described herein.

At block 520, after receiving the user request for the proposed resource site and the geographic location, the system is configured to extract historical interaction information associated with the geographic location and the user from an interaction database. In some embodiments, the interaction database is maintained by an entity associated with the system such as a financial institution, wherein the database is populated by the entity with interaction and location data accessible by the entity. For example, a financial institution may provide analysis of internally collected interaction information associated with clients of the institution (e.g., account holders), wherein only generalized or abstracted information may be provided to other users without disclosing sensitive or identifying information.

In some embodiments, the historical interaction information stored in the interaction database comprises locations associated with past interactions and interaction amounts. In some embodiments the historical interaction information further comprises information associated with the resources involved in recorded interactions such as resource identities (e.g., brands, SKU numbers, barcodes, manufacturer, etc.), resource types (e.g., funds, goods, services, etc.), resource amounts or quantities, and the like. In some embodiments the historical interaction information may further comprise information associated with one or more devices associated with an interaction (e.g., user mobile device, POS device, etc.) and any associated device identifying information.

In one embodiment, the system is configured to identify or determine a geographic location for the proposed resource site based on, at least partially, the historical resource information. The system may identify a geographic location associated with the proposed resource and/or resource site based on interaction information such as purchases of the associated resource and locations of similar or related resource sites. The system may be further configured to define the geographic location based on the relevant historical interaction information, wherein the identified locations of interest (e.g., similar sites, resource demand areas, etc.) are either included or not included in the defined geographic area. In one embodiment, the system may generate a geofence around a geographic location based on the historical interaction information. In some embodiments, the boundaries of a defined geographic area may be updated as additional information is received by the system in real-time.

At block 530, the system is configured to generate a resource map for the geographic location based on the historical interaction information and the proposed resource site. In one embodiment, the resource map is a record of geographic location for the proposed resource site constructed from the information available in the historical interaction information. For example, in some embodiments, wherein the geographic location is a specific location (e.g., a vendor space), the resource map may provide a history of previous users and resource sites at the specific location, wherein the system provides interaction and resource history for those resource sites at the location. In a specific example, a proposed resource site may comprise a clothing store, wherein the system is configured to provide historical interaction information for previous clothing stores that occupied the same space in the past (e.g., product or services offered, previous customer interactions, etc.).

In other embodiments, the resource map comprises a visualization of the geographic location with respect to the resources and/or other resource sites related to the proposed resource site to provide a holistic view of the geographic location to a prospective user and enable optimized position of a proposed resource site. In one embodiment, the resource map may visualize a density of resources and/or other resource sites similar to or related to the proposed resource site. In a specific embodiment, the system is configured to generate and display the resource map as a heat map for the proposed resource site in the geographic location, wherein regions of interest (e.g., other similar resource sites or the like) are indicated on the map with comparatively darker colors than other regions (e.g., areas without similar resource sites). In some embodiments, the resource map is defined by a geofenced area generated by the system using the historical interaction information and the proposed resource site.

In some embodiments, the system is configured to provide and display the resource map to a user on a user device via a user application, wherein the user may interact with the resource map via a user interface. For example, the user may interact with the resource map to pan over the geographic area, zoom in and out of the resource map for additional detail and location definition, or click a location for more information (e.g., address, satellite image, directions, etc.).

At block 540, the system is configured to calculate a landscape score for the proposed resource site at the geographic location. A landscape score for a proposed resource site compares the proposed resource site with other resource sites associated with the geographic location using the generated resource map. In one example, wherein the location is a particular building, storefront, or the like, the system may calculate a landscape score to represent a calculated or expected success rate of the proposed resource site at the location. The landscape score may be based on the historical interaction information for that specific location and previous sites as well as nearby similar resource sites and resource demand. In another example, the system may determine a resource density or saturation value (e.g., based on resource demand or user population), or lack thereof, for a portion of a geographic location to include the proposed resource site.

In response to the calculated landscape score, the system may be configured to trigger an action for the proposed resource site. At block 550, the system is configured to approve or reject the proposed resource site at the geographic location based on the landscape score. For example, the system may be configured to reject the proposed resource site based on the landscape score falling below a predetermined threshold (e.g., a minimum acceptable rate of success). In another example, the system may automatically approve a proposed resource site based on determining an unmet resource demand in a geographic location.

In some embodiments, the system is configured to provide one or more alternative geographic locations for the proposed resource site. In some embodiments, the system may identify and provide alternative locations based on rejection of a first location for the proposed resource site by the system (e.g., the landscape score falling below a predetermined acceptable threshold). In some embodiments, the system may provide location alternatives regardless of a calculated landscape score. In some embodiments, providing an additional or alternative location further comprises the system calculating a second landscape score for the additional or alternative location. In some embodiments, the system may only provide an alternative location when a second landscape score is higher than a first landscape score or the predetermined threshold.

In a specific embodiment of the invention, an financial institution entity maintaining the system is considering whether to provide resource assistance to a customer's proposed resource site at a geographic location (e.g., a new store in a shopping mall). The entity may leverage the system to calculate a predicted rate of success associated with the proposed resource site at the geographic location. In response to analyzing the scored resource site, the system may then approve or reject the proposal. In some embodiments, the system may be configured to provide alternative geographic locations for the proposed resource site (e.g., at a different shopping mall, a number of block away, etc.).

In another specific embodiment, the resource site is a mobile resource site such as a food truck. The system is configured to analyze interaction and location data of other food truck within a geographic location and provide scoring and recommendations for a proposed resource site (i.e., a parked location) for the food truck to operate. The system may be further configured to generate a resource map of all the food trucks in the geographic location based on the available interaction data in the database. In this way, the system may score a proposed site and/or provide alternative locations for the food truck to operate based on other food trucks, restaurants, and other similar resources in the area. For example, the system may be configured to direct a user's food truck to an area with historically high demand for the truck's food type as determined from past historical interactions. Alternatively, the system may be configured to direct a user's food truck to a location without a similar food truck located within a predetermined distance of the location.

In one embodiment, system is further configured to generate a communication platform and resource supply chain for a defined geographic region. In some embodiments, the system may only be available to those users associated with a maintaining entity (e.g., account holders associated with a financial institution). The system may analyze and monitor a number of resource sites for users within a geographic area. The system may be configured to generate a resource map of all participating resource sites for the geographic location and provide the resource map to the users. In some embodiments, the system may identify similar or related resource sites within the resource map. In this way, the system may allow the users to search for complimentary resources and/or resource sites in a nearby geographic location. For example, the system may allow for a user to identify a local supplier for the user's own resource site.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with geographic resource mapping and positioning optimization.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for geographic resource mapping and positioning optimization, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for geographic resource mapping, the system comprising:
    a memory device with computer-readable program code stored thereon; a communication device connected to a network; and a processing device, wherein the processing device is configured to execute the computer-readable program code to:

receive, from a user device associated with a user, a geographic location for a proposed resource site, a resource site type for the proposed resource site, interaction types for the proposed resource site, and resource types for the proposed resource site;

extract historical interaction information associated with the geographic location and the user from an interaction database, wherein the interaction database comprises interaction amounts associated with recorded interactions, resource types associated with the recorded interactions, and resource amounts associated with the recorded interactions, and wherein the interaction database stores data from an incoming data stream in real-time;

generate a first resource map for the geographic location based on the historical interaction information and the proposed resource site, wherein the first resource map comprises a history of previous users at the geographic location, historical resource sites at the geographic location, the historical interaction information associated with the geographical location, historical resource types of the historical resource sites, historical resource amounts of the historical resource sites, and a first visualization of the geographic location with respect to other resource sites related to the proposed resource site;

calculate a landscape score for the proposed resource site at the geographic location, wherein the landscape score compares the proposed resource site with other resource sites associated with the geographic location based on the generated first resource map;

based on the landscape score falling below a predetermined threshold, reject the proposed resource site at the geographic location;

extract, based on rejecting the proposed resource site at the geographic location, historical information associated with other geographic locations from the interaction database;

calculate, based on the resource site type for the proposed resource site, the interaction types for the proposed resource site, the resource types for the proposed resource site, and the historical interaction information associated with the other geographic locations, landscape scores for the other geographic locations;

identify, based on the landscape scores for the other geographic locations, potential geographic locations;

generate a second resource map for the other geographic locations based on the historical interaction information and the proposed resource site, wherein the second resource map comprises a history of previous users at the other geographic locations, historical resource sites at the other geographic locations, the historical interaction information associated with the other geographic locations, and a second visualization of the other geographic locations;

wherein the processing device is further configured to generate a geofenced area around the geographic location based off of the landscape score, wherein the first and second resource maps are defined by the geofenced area;

wherein the processing device is further configured to recalculate the geofenced area based on real time updates to the landscape score;

provide and display the second resource map for the other geographic locations to the user on the user device via a user application.

2. The system of claim 1, wherein the processing device is further configured to provide an alternative geographic location for the proposed resource site based on the landscape score falling below a predetermined threshold.

3. The system of claim 2, wherein the landscape score is a first landscape score, and wherein providing the alternative geographic location further comprises calculating a second landscape score for the alternative geographic location, wherein the second landscape score is higher than the predetermined threshold or the first landscape score.

4. The system of claim 1, wherein the processing device is configured to execute the computer-readable program code to, when generating the first resource map further comprises displaying the map, display the first resource map as a heat map for the proposed resource site and the other resource sites for the geographic location in an interactive user interface presented in an application on a the user application on the user device.

5. The system of claim 1, wherein the historical interaction information stored in the interaction database comprises interaction locations, interaction amounts, resource types, resource amounts, and interaction device information.

6. A computer-implemented method for geographic resource mapping, the computer-implemented method comprising:

receiving, from a user device associated with a user, a geographic location for a proposed resource site, a resource site type for the proposed resource site, interaction types for the proposed resource site, and resource types for the proposed resource site;

extracting historical interaction information associated with the geographic location and the user from an interaction database, wherein the interaction database comprises interaction amounts associated with recorded interactions, resource types associated with the recorded interactions, and resource amounts associated with the recorded interactions, and wherein the interaction database stores data from an incoming data stream in real-time;

generating a first resource map for the geographic location based on the historical interaction information and the proposed resource site, wherein the first resource map comprises a history of previous users at the geographic location, historical resource sites at the geographic location, the historical interaction information associated with the geographical location, historical resource types of the historical resource sites, historical resource amounts of the historical resource sites, and a first visualization of the geographic location with respect to other resource sites related to the proposed resource site;

calculating a landscape score for the proposed resource site at the geographic location, wherein the landscape score compares the proposed resource site with other resource sites associated with the geographic location based on the generated first resource map;

based on the landscape score falling below a predetermined threshold, rejecting the proposed resource site at the geographic location;

extracting, based on rejecting the proposed resource site at the geographic location, historical information associated with other geographic locations from the interaction database; calculating, based on the resource site type for the proposed resource site, the interaction types for the proposed resource site, the resource types for the proposed resource site, and the historical interaction information associated with the other geographic locations, landscape scores for the other geographic locations; identifying, based on the landscape scores for the other geographic locations, potential geographic locations;
generating a second resource map for the other geographic locations based on the historical interaction information and the proposed resource site, wherein the second resource map comprises a history of previous users at the other geographic locations, historical resource sites at the other geographic locations, the historical interaction information associated with the other geographic locations, and a second visualization of the other geographic locations;
wherein the processing device is further configured to generate a geofenced area around the geographic location based off of the landscape score, wherein the first and second resource maps are defined by the geofenced area;
wherein the processing device is further configured to recalculate the geofenced area based on real time updates to the landscape score;
providing and displaying the second resource map for the other geographic locations to the user on the user device via a user application.

7. The computer-implemented method of claim 6 further comprising providing an alternative geographic location for the proposed resource site based on the landscape score falling below a predetermined threshold.

8. The computer-implemented method of claim 7, wherein the landscape score is a first landscape score, and wherein providing the alternative geographic location further comprises calculating a second landscape score for the alternative geographic location, wherein the second landscape score is higher than the predetermined threshold or the first landscape score.

9. The computer-implemented method of claim 6, wherein generating the first resource map further comprises displaying the first resource map as a heat map for the proposed resource site and the other resource sites for the geographic location in an interactive user interface presented in an application on a the user application on the user device.

10. The computer-implemented method of claim 6, wherein the historical interaction information stored in the interaction database comprises interaction locations, interaction amounts, resource types, resource amounts, and interaction device information.

11. A computer program product for geographic resource mapping, wherein the computer program product comprises a non-transitory computer-readable medium comprising computer-readable instructions, the computer-readable instructions, when executed by a processing device, cause the processing device to:
receive, from a user device associated with a user, a geographic location for a proposed resource-site, a resource site type for the proposed resource site, interaction types for the proposed resource site, and resource types for the proposed resource site;
extract historical interaction information associated with the geographic location and the user from an interaction database, wherein the interaction database comprises interaction amounts associated with recorded interactions, resource types associated with the recorded interactions, and resource amounts associated with the recorded interactions, and wherein the interaction database stores data from an incoming data stream in real-time;
generate a first resource map for the geographic location based on the historical interaction information and the proposed resource site, wherein the first resource map comprises a history of previous users at the geographic location, historical resource sites at the geographic location, the historical interaction information associated with the geographical location, historical resource types of the historical resource sites, historical resource amounts of the historical resource sites, and a first visualization of the geographic location with respect to other resource sites related to the proposed resource site;
calculate a landscape score for the proposed resource site at the geographic location, wherein the landscape score compares the proposed resource site with other resource sites associated with the geographic location based on the generated first resource map;
based on the landscape score falling below a predetermined threshold, reject the proposed resource site at the geographic location;
extract, based on rejecting the proposed resource site at the geographic location, historical information associated with other geographic locations from the interaction database;
calculate, based on the resource site type for the proposed resource site, the interaction types for the proposed resource site, the resource types for the proposed resource site, and the historical interaction information associated with the other geographic locations, landscape scores for the other geographic locations;
identify, based on the landscape scores for the other geographic locations, potential geographic locations;
generate a second resource map for the other geographic locations based on the historical interaction information and the proposed resource site, wherein the second resource map comprises a history of previous users at the other geographic locations, historical resource sites at the other geographic locations, the historical interaction information associated with the other geographic locations, and a second visualization of the other geographic locations;
wherein the processing device is further configured to generate a geofenced area around the geographic location based off of the landscape score, wherein the first and second resource maps are defined by the geofenced area;
wherein the processing device is further configured to recalculate the geofenced area based on real time updates to the landscape score;
provide and display the second resource map for the other geographic locations to the user on the user device via a user application.

12. The computer program product of claim 11, wherein the computer-readable instructions, when executed by the processing device, further cause the processing device to provide an alternative geographic location for the proposed resource site based on the landscape score falling below a predetermined threshold.

13. The computer program product of claim 12, wherein the landscape score is a first landscape score, and wherein providing the alternative geographic location further comprises calculating a second landscape score for the alternative geographic location, wherein the second landscape score is higher than the predetermined threshold or the first landscape score.

14. The computer program product of claim 11, wherein the computer-readable instructions, when executed by the processing device, further cause the processing device to display the first resource map as a heat map for the proposed resource site and the other resource sites for the geographic location in an interactive user interface presented in an application on a the user application on the user device.

* * * * *